3,063,975
COPOLYMERS OF VINYLBENZYL ALCOHOL AND VINYLBENZYL ALKYL ETHERS
John G. Abramo and Earl C. Chapin, Springfield, Mass., assignors to Monsanto Chemical Company, St. Louis, Mo., a corporation of Delaware
No Drawing. Filed Mar. 25, 1960, Ser. No. 17,453
5 Claims. (Cl. 260—80.3)

The present invention relates to synthetic copolymer materials and more specifically to synthetic copolymers containing available hydroxyl groups.

While polyvinylbenzyl ethers are known to possess useful polymer properties, they are nevertheless limited in their applications because of their lack of reactive functional groups. In this regard the homopolymers of polyvinylbenzyl ethers are not compatible with melamine-urea resin and will not react with diisocyanates or dibasic acids. As a consequence, they cannot be used in conjunction with these homopolymers to give surface coating, laminating adhesives, etc., compositions in which the homopolymers have been rendered insoluble to common organic solvents such as xylene, etc. by reaction with and cross-linking through these other materials.

Accordingly, it is a principal object of this invention to provide synthetic copolymers containing available hydroxyl groups.

Another object is that of providing synthetic copolymers which because of the hydroxyl groups present on the same are available to be cross-linked and as a result are adapted for use in producing solvent-resistant surface coatings and other applications.

Other objects of the invention will in part be obvious and will in part appear hereinafter.

These and other objects of the invention can be attained in a synthetic copolymer comprising in copolymerized form vinylbenzyl alcohol having the structure:

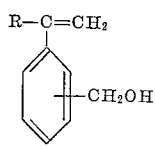

wherein R is selected from the class consisting of hydrogen and methyl radical with vinylbenzyl alkyl ethers having the structure:

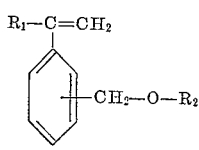

wherein $R_1$ is selected from the class consisting of hydrogen and methyl radical and $R_2$ represents an alkyl radical.

The following examples are given in illustration of the invention. Where parts are mentioned, parts by weight are intended unless otherwise described.

*Example I*

A solution of 26.6 g. of p-vinylbenzyl n-octyl ether, 6.7 g. of p-vinylbenzyl alcohol, 33.3 g. of toluene and 0.067 ml. of ditertiary butyl peroxide is charged to a 300 ml. stainless steel pressure bomb. The bomb is heated to 120° C. for 20 hours under an inert atmosphere of nitrogen. The bomb is allowed to cool to room temperature and the polymer is precipitated by pouring the resulting viscous solution into about 500 ml. of methanol. The polymer is dried at room temperature in vacuo overnight. As a result 27 g. of a colorless elastic polymer is obtained containing 2.55% hydroxyl content corresponding to a composition of 20.2% p-vinylbenzyl alcohol and 79.8% p-vinylbenzyl n-octyl ether.

The copolymer is molded into a test specimen approximately 4 inches long, ⅜ inch wide and .025 inch thick. The glass temperature of this specimen is determined to be −6° C. by use of the torsion pendulum. The molding is a clear, colorless rubber capable of elongations of greater than 500% and exhibiting rapid and essentially complete recovery.

*Example II*

The procedure of Example I is again followed using p-vinylbenzyl ethyl ether in place of the p-vinylbenzyl n-octyl ether used in that example. The copolymer product which results is less rubbery; evidences less elasticity than does the product derived from the previous example.

*Example III*

The procedure of Example I is followed again using p-vinylbenzyl 2-ethyldecyl ether in place of the p-vinylbenzyl n-octyl ether used there. The copolymer product which results is more rubbery; evidences greater elasticity than does the product derived from that example.

A particular embodiment of the invention is that which results from the inclusion of chain-transfer agents such as allyl alcohol, bromotrichloromethane, mercaptans such as tertiary dodecylmercaptan, etc. at the outset or during copolymerization of the vinylbenzyl alcohol with the vinylbenzyl ethers.

The amount of chain-transfer agent can be varied, with good results being derived from the inclusion in the reaction mass of 0.2–75% by weight of same as determined on the weight of the monomers present. In this manner, copolymers having relatively low molecular weights of about 1500–10,000 number average molecular weight as determined cryoscopically can be obtained. Copolymers of this type then have good solubility in common solvents such as xylene, xylene-butanol mixtures, acetone, etc. and can be expeditiously used in surface coating, laminating adhesive and like applications, in which solvent vehicles are used.

*Example IV*

A solution of 7.5 grams of vinylbenzyl n-octyl ether, 7.5 grams of p-vinylbenzyl alcohol, 15 grams of allyl alcohol and 0.5 ml. ditertiary-butyl peroxide is heated under inert atmosphere for 3 hours at 140° C. The clear, colorless viscous syrup is precipitated in hexane and the polymer is recovered by drying in vacuo at room temperature. Percent conversion to polymer is determined to be 32% based on total monomer charge. The product which is a tough, low-melting elastomeric material contains 6.7% hydroxyl content. Additionally, the product is soluble in xylene-butanol mixtures, dimethyl formamide and acetone.

*Example V*

Three grams of a solution constituting xylene-butanol containing 32% solids of the polymer prepared in Example IV are mixed with 0.5 grams of a 60% solids solution of a modified butylated hexamethylol melamine in equal parts of xylene-butanol. The resulting solution is clear and colorless. This solution is cast as a 3 mil film on 10 mil steel-tin plate. After drying for 20 minutes at room temperature the film is heated at 160° C. for 20 minutes in a circulating air oven. The resulting film is clear, tough, and glossy, and remains unattacked by xylene-butanol. It shows good adhesion to the tin plate and cannot be removed even after the plate is bent.

The present invention is directed to the production of synthetic copolymers comprising in copolymerized form vinylbenzyl alcohols having the structure:

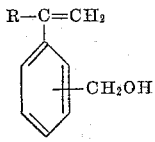

wherein R is selected from the class consisting of hydrogen and methyl radical with vinylbenzyl alkyl ethers having the structure:

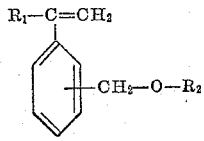

wherein $R_1$ is selected from the class consisting of hydrogen and methyl radicals and $R_2$ represents an alkyl radical.

The vinylbenzyl alcohols which can be used as monomeric components include those having the structure:

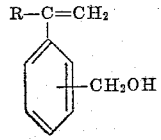

wherein R is selected from the class consisting of hydrogen and methyl radicals. More particularly, the vinylbenzyl alcohols include the o-vinylbenzyl alcohol, m-vinylbenzyl alcohol and the p-vinylbenzyl alcohol when R represents hydrogen; and when R represents a methyl radical the o-isopropenylbenzyl alcohol, m-isopropenylbenzyl alcohol and the p-isopropenylbenzyl alcohol are representative of the subject alcohols. Various simple substituents such as the halogens and alkyl radicals can also be accommodated on the phenyl radical, to provide vinylbenzyl alcohols intended to be included here. The subject vinylbenzyl alcohols can be produced in the manner set forth in copending application S.N. 747,828, filed July 11, 1958, in the name of John G. Abramo. Mixtures of these vinylbenzyl alcohols can also be used.

The vinylbenzyl alkyl ethers which can be used as monomeric components include those having the structure:

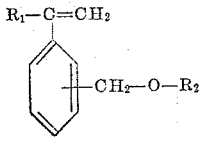

wherein $R_1$ is selected from the class consisting of hydrogen and methyl radical and $R_2$ is an alkyl radical. The preferred ethers are those in which $R_2$ represents a saturated alkyl radical which can be straight or branched in nature and the longest continuous alkyl chain which contains 1–12 carbon atoms. Increase in the number of carbon atoms contained in the alkyl radical reflects an increase in elasticity or rubbery qualities of the resulting copolymer product. Representative of the subject ethers are the o-vinylbenzyl methyl ethers, m-vinylbenzyl methyl ethers, and p-vinylbenzyl methyl ethers through the o-vinylbenzyl dodecyl ethers, m-vinylbenzyl dodecyl ethers and the p-vinylbenzyl dodecyl ethers when $R_1$ represents hydrogen; and when $R_1$ represents a methyl radical the o-isopropenylbenzyl methyl ethers, m-isopropenylbenzyl methyl ethers, p-isopropenylbenzyl methyl ethers, through the o-isopropenylbenzyl dodecyl ethers, m-isopropenylbenzyl dodecyl ethers and p-isopropenylbenzyl dodecyl ethers.

Various simple substituents such as the halogens and alkyl radicals can also be accommodated on the phenyl radical, to provide vinylbenzyl alkyl ethers intended to be included here. Additionally, mixtures of these ethers can be used. The subject ethers can be produced in the manner set forth in copending application S.N. 747,828, filed July 11, 1958, in the name of John G. Abramo.

Copolymers which are desirable are those containing in copolymerized form 2 to 98 weight percent of vinylbenzyl alcohol and 98 to 2 weight percent of vinylbenzyl alkyl ether, determined on the weight of the copolymer. More preferably they can obtain 10 to 60 weight percent of vinylbenzyl alcohol and 90 to 40 weight percent of vinylbenzyl alkyl ether. Accordingly, copolymers containing about 0.25 to 12.3% hydroxyl content as determined on a weight basis, exhibit desirable properties, with those containing 1.25 to 7.25 hydroxyl content being the more preferred.

The copolymers of the present invention can be prepared using mass, solution or emulsion polymerization techniques. It bears cautioning that the previously described expedient of using chain transfer agents should be practiced only in the mass and solution type polymerizations.

In the mass and solution polymerizations a monomer mixture is prepared of from 2 to 98 parts by weight of vinylbenzyl alcohol and 98 to 2 parts by weight of vinylbenzyl alkyl ether, parts by weight being determined on the weight of the total monomers. The monomer mixture is subjected to heating at about 60 to 200° C. under at least autogenous pressure until the monomers become copolymerized or interpolymerized. Copolymerization can be thermally initiated but it is preferred to employ a small quantity of a free radical polymerization initiator such as for example hydrogen peroxide, ditertiarybutyl peroxide, benzoyl peroxide, tertiary butyl perbenzoate, pinacolone peroxide, ditertiarybutyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution type of polymerization are organic liquids which are inert to the reaction, e.g., toluene, xylene, benzene, dioxane, etc.

In the emulsion polymerization, a monomeric mixture prepared as above, is continuously and slowly added to an excess of water maintained at a polymerization temperature of 0 to 150° C. and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferred, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic, or cationic. Those which operate satisfactorily either alone or in mixtures thereof include salts of high molecular weight fatty acids, quaternary ammonium salts, alkali metal salts of rosin acids, alkali metal salts of long chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer.

The copolymers of the present invention are clear, substantially colorless elastomeric materials which can be used in linear copolymer form, or as obtained from any of the mass, solution or emulsion polymerization processes described above, to provide a variety of film, coating or laminating applications. In linear form the subject copolymers have utility in application where rubbery characteristics, or elasticity is a desirable attribute. As indicated previously the use of the high alkyl ether will produce copolymers having greater elasticity. Coincidently increasing amounts of the ether component in the copolymer will also lead to an increase in the rubbery or elastic properties of the resulting copolymer.

Due to the presence of available hydroxyl groups the subject copolymers can be compounded with other materials such as melamine-formaldehyde and urea-formaldehyde condensates, alkyd resins as well as other curing agents such as di-isocyanates, di-acid chlorides, etc. After being so compounded or mixed the copolymers can be dissolved in solvents such as xylene-butanol mixtures. In this form they can be conveniently preliminarily fabricated into films, coatings, laminate adhesives, etc., and later on exposure to elevated temperatures they become cured or cross-linked, with the hydroxyl groups present on the copolymers acting as sites for reaction with the curing agents. Curing can also be facilitated with or without the use of elevated temperature, by the use of catalysts. It is also possible to carry out partial cross-linking or curing of the copolymers prior to the preliminary fabrication, followed later by completion of the same when the films, coatings, laminate adhesion, etc. applications have been permanently located. This practice can be used to take full advantage of the copolymers which are provided with regulated lower molecular weight as a result of using chain-transfer agents in the manner previously described. Those copolymers then having higher molecular weights can be subjected to substantially the same practice of curing or cross-linking to give products of the nature of vulcanized rubbers.

The copolymers of the present invention can also be compounded in the usual manner with various fillers and adjuncts as colorants, plasticizers, etc.

It will thus be seen that the objects set forth above among those made apparent from the preceding description are efficiently attained and since certain changes may be made in carrying out the above process and in the polymer products which result without departing from the scope of the invention, it is intended that all matter contained in the above description shall be interpreted as illustrative and not in a limiting sense.

What is claimed is:

1. Synthetic copolymers comprising in copolymerized form (a) 2–98 weight % of a vinylbenzyl alcohol having the structure:

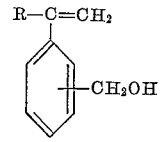

wherein R is selected from the class consisting of hydrogen and methyl radical and (b) 98–2 weight % of a vinylbenzyl alkyl ether having the structure:

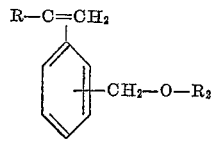

wherein $R_1$ is selected from the class consisting of hydrogen and methyl radical and $R_2$ represents an alkyl radical the total of components (a) and (b) being 100 weight %.

2. The synthetic copolymers according to claim 1 wherein the alkyl radical represented by $R_2$ of the vinylbenzyl alkyl ethers is selected from the class consisting of alkyl radicals containing 1–12 carbon atoms in the longest continuous chain thereof.

3. A synthetic copolymer as in claim 1 wherein the vinylbenzyl alkyl ether is p-vinylbenzyl n-octyl ether.

4. A synthetic copolymer as in claim 1 wherein the vinylbenzyl alkyl ether is p-vinylbenzyl ethyl ether.

5. A synthetic copolymer as in claim 1 wherein the vinylbenzyl alkyl ether is p-vinylbenzyl 2-ethyldecyl ether.

References Cited in the file of this patent

UNITED STATES PATENTS

| | | |
|---|---|---|
| 2,534,193 | Emmerson | Dec. 12, 1950 |
| 2,825,719 | Herrie et al. | Mar. 4, 1958 |